United States Patent Office 3,314,856
Patented Apr. 18, 1967

3,314,856
HEXAHYDROBENZYL CARBONATE ESTER OF TESTOSTERONE
André Allais, Les Lilas, and Jean Meier, Coeuilly-Champigny, France, assignors to Roussel-Uclaf, Paris, France, a corporation of France
Filed Aug. 21, 1964, Ser. No. 391,120
Claims priority, application France, Mar. 28, 1961, 857,055
The portion of the term of the patent subsequent to Oct. 2, 1979, has been disclaimed
5 Claims. (Cl. 167—74)

The invention relates to the novel ester, the hexahydrobenzyl carbonate of testosterone, and to a novel process for its preparation. Additionally the invention relates to novel compositions and method of treating hyperestrogenic and hypoandrogenic disturbances in warm blooded animals.

This application is a continuation-in-part application of our copending application Ser. No. 181,896, filed Mar. 23, 1962, now abandoned.

It is an object of the invention to provide the novel product, the hexahydrobenzyl carbonate of testosterone.

It is another object of the invention to provide a novel composition for the control of hyperestrogenic and hypoandrogenic disturbances.

It is an additional object of the invention to provide a method for controlling hyperestrogenic and hypoandrogenic disturbances.

These and other objects and advantages of the invention will become obvious from the following detailed description.

The hexahydrobenzyl carbonate of testosterone of the invention has the formula

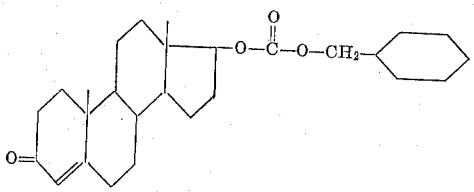

The said product has interesting pharmacological properties. It possesses particularly an immediate intense androgenic and anabolic activity even at low dosages because of its high rate of saponification and this activity is prolonged at high dosages for periods of at least 16 weeks in animals and clinical data with $C^{14}$ tagged molecules has demonstrated that this activity in humans lasts for 35 to 45 days. Moreover, since the product is very soluble in oil, it can be easily administered in a single massive dose to obtain prolonged activity. Moreover, the androgenic and anabolic activity of hexahydrozenzyl carbonate of testosterone is double that of the cyclohexyl carbonate of testosterone.

The said product can be used for the control of manifestations of andropause, prostatic hypertrophia, eunuchoidism, adiposogenital syndrome, pubertary or growth retardation, psychoses of involution, asthenia, depressive psychosis, endocrine or rheumatoid arthropathy, menorrhagia, mastopathy. Also, it can be used as an inhibitor of milk flow.

The hexahydrobenzyl carbonate of testosterone is prepared by reacting testosterone with a hexahydrobenzyl haloformate such as hexahydrobenzyl chloroformate to form an impure mixture containing the hexahydrobenzyl carbonate of testosterone, acidifying the mixture, extracting the latter with an organic solvent, removing the organic solvent from the extract to form a residue and recrystallizing the latter from petroleum ether to obtain crystalline hexahydrobenzyl carbonate of testosterone. The reaction is preferably carried out at temperatures of about 10° to about 20° C., most preferably 15° C.

Referring now to the drawings.

Figure 1:
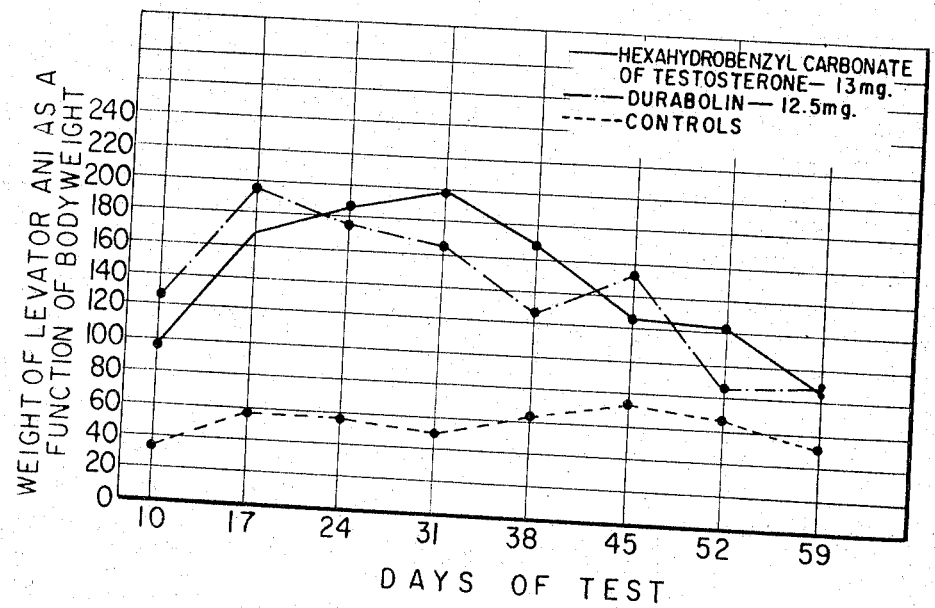
FIG. 1 is a graph comparing the prolonged androgenic activity of hexahydrobenzyl carbonate of testosterone with that of the commercial prolonged acting product, phenyl propionate of 19-nor testosterone.

The novel compositions having anabolic and androgenic activity are comprised of the hexahydrobenzyl carbonate of testosterone and an inert pharmaceutical carrier, particularly an oily solvent. The compositions may be in the form of oily solutions, in ampules or multiple dose flacons, in the form of implants and as suppositories.

The novel method of inducing anabolic and androgenic activity in warm blooded animals comprises administering an effective amount of hexahydrobenzyl carbonate of testosterone to the animal. The said product may be administered by transcutaneous methods, by intramuscular or subcutaneous injections or by rectal methods. The usual useful dose to the adult is between 100 to 500 mg. administered by subcutaneous or intramuscular methods in a single massive dose.

In the following example there are described several preferred embodiments to illustrate the invention. However, it should be understood that the invention is not intended to be limited to the specific embodiments.

EXAMPLE

*Step A: Preparation of hexahydrobenzyl chloroformate*

Phosgene was allowed to bubble for a period of an hour and a half into 120 cc. of anhydrous ether cooled to 0° C. Then 30 g. of hexahydrobenzylic alcohol prepared according to Bailey, J. Am. Chem. Soc., 1955, 77, p. 358 were introduced. The reaction mixture was agitated at 0° C. for a period of 24 hours. Next the phosgene was removed by bubbling nitrogen therethrough. The mixture was concentrated to dryness under vacuum and hexahydrobenzyl chloroformate was obtained. The product occurred in the form of a colorless liquid, miscible in the usual organic solvents. Its boiling point at 2 mm. was 50° C.±1° and its index of refraction was $$n_D{}^{25} = 1.457 \pm 0.00025$$

This product is not described in the literature.

*Step B: Preparation of the hexahydrobenzyl carbonate of testosterone*

400 gm. of testosterone, 400 cc. of pyridine and 800 cc. of dioxane were introduced into a large reaction flask and after solution occurred at room temperature, the temperature of the solution was reduced to about 15° C. Then, a solution of 280 gm. of hexahydrobenzyl chloroformate in 1200 cc. of dioxane was slowly added with agitation. The temperature was maintained at 15° C. and the agitation was continued for four hours.

The resulting reaction mixture was poured with strong agitation into a mixture of water and ice whereupon an oily product rose to the surface of the liquid. 400 cc. of hydrochloric acid were added to the mixture and after agitation for fifteen minutes, it was extracted four times with methylene chloride. The methylene chloride extracts were combined and washed successively with a normal solution of hydrochloric acid, with water, with a 5% solution of sodium bicarbonate and then with water until the wash waters were neutral. The organic solution was dried and evaporated to dryness under vacuum. The dry residue was dissolved in 2 liters of light petroleum ether (boiling point 60 to 75° C.) and the solution was decolorized with activated carbon, filtered and dried under vacuum to obtain 680 gm. of the hexahydrobenzyl carbonate of testosterone. The raw product was redissolved in 800 cc. of light petroleum ether and crystallization was effected by cooling to −15° C. After cooling for two hours, the precipitate was separated by filtration, triturated with iced light petroleum ether, washed three times with the same solvent and then dried at 45° C. to obtain 438 gm. (73.6% yield) of the hexahydrobenzyl carbonate of testosterone having a melting point of 82° C. The product was recrystallized in light petroleum ether to obtain 407 gm. of product having a melting point of 85 to 86° C. and a specific rotation $[\alpha]_D^{20} = +85° \pm 1$ (c.=0.5% in ethanol). The petroleum ether mother liquors were worked up to obtain a second and third yield of crystals bringing the total yield to 86.5%.

U.V. Spectrum (ethanol)

$$E_{1\,cm.}^1 = 389–393, \text{ or } \epsilon = 16,650 \text{ to } 16,800$$

$$\lambda_{max.} \; 241 \; m\mu$$

The product occurred in the form of colorless, odorless prismatic crystals soluble in acetone, benzene, chloroform, alcohol and ether, slightly soluble in light petroleum ether and insoluble in water.

PHARMACOLOGICAL DATA

A. Determination of the immediate androgenic and anabolic activity

The tests were effected according to the Hershberger technique (Proc. Soc. Exp. Biol. Med., 1953, vol. 83, p. 175) slightly modified. It consisted of a daily administration of the compound to be studied to male rats castrated at the age of 3½ weeks. The rats were treated for a period of 10 days starting the day after the castration and were sacrificed on the 11th day 22 to 26 hours after the last administration. They were autopsied and the organs of interest were separated and weighed, in particular, the lifter muscle of the anus (levator ani) for the study of the anabolic activity and the ventral prostate and the seminal vesicles for the study of the simultaneous androgenic effect.

The products tested were administered subcutaneously in a volume of 0.2 cc. per rat in solution in olive oil containing 5% benzyl alcohol. The products tested were the hexahydrobenzyl carbonate of testosterone, Durabolin (phenyl propionate of 19-nor-testosterone), Dianabol (17α-methyl-Δ¹-testosterone) and Primobolan (1-methyl-Δ¹-androstene-17β-ol-3-one-17-acetate) and the total doses administered were 100γ, 500γ and 1000γ. The results obtained are summarized in Table I.

Table I shows that hexahydrobenzyl carbonate of testosterone shows an immediate androgenic and anabolic activity superior to or equal to the immediate activity of the prior art androgenic and anabolic agents.

B. Speed of saponification

The speed of saponification of cyclohexyl carbonate of testosterone and hexahydrobenzyl carbonate of testosterone was determined in an acetone-water media in the presence of sodium hydroxide at 20° C. The amount of testosterone freed by saponification was determined colorimetrically by a colored reaction based on the condensation of testosterone with dinitrobenzyl chloride and the appearance of a red coloration upon the addition of a solution of piperazine hydrate in dimethylformamide. The intensity of the coloration was determined spectrophotometrically at 515 mμ by reference to a control block and correlatively the same reaction was effected with known quantities of testosterone. The results are summarized in Table II.

TABLE II

| Percent Saponification of Cyclohexyl Carbonate of Testosterone | Time in Hours | Percent Saponification of Hexahydrobenzyl carbonate of Testosterone |
|---|---|---|
| 8 | 4 | 20 |
| 12 | 7 | 34 |
| 39 | 24 | 85 |
| 69 | 53 | |
| 91 | 72 | 95 |

It can be easily seen from Table II that unexpectedly the hexahydrobenzyl carbonate of testosterone possesses a very high rate of saponification. The said ester because of its high molecular weight would be expected to saponify slowly. This high rate of saponification is manifested in animals by an immediate intense activity even at low doses as seen by the Hersheberger test in part A.

C. Determination of prolonged activity

The test of prolonged activity was determined according to the technique of Sakamoto et al. (Proc. Soc. Exp. Biol. Med., 1951, vol. 76, p. 406). Lots of five male rats, castrated at the age of 4½ weeks, received a single subcutaneous injection in a volume of 1 cc. of the products to be tested at the age of 7½ weeks. The animals were sacrificed at controlled dates: 10, 17, 24, 31 and 38 days

TABLE I

| Compound administered | Dosage in γ | Weight of rats 1st day | Weight of rats last day of treatment | Fresh kidneys, mg. | Fresh kidneys, g./kg. per rat | Dried kidneys, mg. | Dried kidneys, g./kg. per rat | LAF, mg. | LAF, g./kg. per rat | LAS, mg. | LAS, g./kg. per rat | Seminal vesicles | Prostate |
|---|---|---|---|---|---|---|---|---|---|---|---|---|---|
| Controls | | 51 | 97 | 468 | 4.82 | 99.7 | 1.02 | 19.4 | 0.201 | 4.2 | 0.043 | 5.9 | 4.0 |
| Hexahydrobenzyl carbonate of testosterone | 100 | 52 | 94 | 509 | 5.48 | 106.0 | 1.14 | 33.4 | 0.366 | 6.4 | 0.069 | 127 | 108 |
| | 500 | 51 | 99 | 512 | 5.14 | 111 | 1.12 | 60.7 | 0.606 | 12.9 | 0.128 | 290 | 167 |
| | 1,000 | 51 | 102 | 531 | 5.20 | 115 | 1.12 | 68.1 | 0.682 | 15.1 | 0.147 | 339 | 188 |
| Durabolin | 100 | 51 | 106 | 545 | 5.16 | 116 | 1.10 | 49.3 | 0.465 | 10.5 | 0.099 | 43 | 46 |
| | 500 | 51 | 86 | 463 | 5.41 | 100 | 1.17 | 45.6 | 0.529 | 10.1 | 0.117 | 200 | 101 |
| | 1,000 | 51 | 96 | 496 | 5.18 | 108 | 1.13 | 61.2 | 0.630 | 12.8 | 0.133 | 238 | 140 |
| Primobolan | 100 | 51 | 94 | 445 | 4.74 | 96 | 1.03 | 39.1 | 0.431 | 8.4 | 0.092 | 47 | 47 |
| | 500 | 51 | 101 | 542 | 5.34 | 115 | 1.13 | 49.6 | 0.490 | 9.6 | 0.095 | 123 | 95 |
| | 1,000 | 51 | 88 | 433 | 4.97 | 95 | 1.09 | 61.0 | 0.702 | 13.7 | 0.154 | 190 | 109 |
| Dianabol | 100 | 51 | 100 | 478 | 4.77 | 102 | 1.02 | 20.4 | 0.207 | 3.8 | 0.037 | 9 | 15 |
| | 500 | 51 | 93 | 499 | 5.39 | 108 | 1.17 | 29.8 | 0.320 | 6.1 | 0.065 | 23 | 52 |
| | 1,000 | 51 | 104 | 538 | 5.19 | 115 | 1.11 | 30.6 | 0.293 | 6.4 | 0.062 | 25 | 51 | after the injection. The animals were autopsied after sacrifice and the organs of interest were separated and weighed. The seminal vesicules were studied for androgenic activity and the kidneys and elevating muscle of the anus (levator ani) were studied for reno tropic and myotropic activity. The compounds tested were (A) hexahydrobenzyl carbonate of testosterone, (B) cyclohexyl carbonate testosterone and (C) phenyl propionate of 19-nor-testosterone. The results are summarized in Table III.

after injection. No symptoms of intoxication nor mortality were noted in the course of this period. The compound is thus non-toxic, even at a dose of 150 mg./kg.

Various modifications of the process and method of the invention may be made without departing from the spirit or scope thereof and it is to be understood that the invention is to be limited only as defined in the appended claims.

We claim:
1. The hexahydrobenzyl carbonate of testosterone.

TABLE III

| Duration of treatment | Doses administered, mg. | Weight of rats at the day of— | | Fresh kidneys, mg. | Rf | Dried kidneys, mg. | Rs | Levator Ani, mg. | Lf | Dry Levator Ani | Ls | Seminal vesicules | Prostate |
|---|---|---|---|---|---|---|---|---|---|---|---|---|---|
| | | Start of treatment | Sacrifice | | | | | | | | | | |
| 10 days: | | | | | | | | | | | | | |
| Controls | 0 | 136 | 174 | 731 | 4.21 | 162 | 0.931 | 34.5 | 0.197 | 6.1 | 0.035 | 6.5 | 2.0 |
| A | 13 | 151 | 191 | 934 | 4.90 | 197 | 1.03 | 98.6 | 0.522 | 17.5 | 0.093 | 318 | 198 |
| | 26 | 139 | 187 | 908 | 4.87 | 210 | 1.13 | 139 | 0.747 | 30.2 | 0.162 | 335.5 | 196.6 |
| B | 25 | | 175 | | 4.6 | | 1 | 103 | 0.59 | | 0.12 | 375 | |
| C | 12.5 | 148 | 188 | 922 | 4.90 | 200 | 1.07 | 125 | 0.661 | 26.6 | 0.14 | 309 | 156 |
| | 25 | 131 | 174 | 913 | 5.24 | 198 | 1.13 | 160.8 | 0.923 | 35.3 | 0.202 | 284.3 | 144.3 |
| 17 days: | | | | | | | | | | | | | |
| Controls | 0 | 131 | 195 | 872 | 4.45 | 193 | 0.983 | 54.6 | 0.278 | 11.7 | 0.059 | 8.3 | 7.4 |
| A | 13 | 150 | 222 | 1,155 | 5.20 | 260 | 1.17 | 168 | 0.760 | 37.4 | 0.150 | 579.0 | 305 |
| | 26 | 123 | 185 | 895 | 4.84 | 201 | 1.08 | 178.8 | 0.967 | 41 | 0.222 | 904.6 | 353 |
| B | 25 | | 180 | | 5.4 | | 1.1 | 144 | 0.8 | | 0.18 | 758 | |
| C | 12.5 | 144 | 204 | 1,018 | 5.02 | 240 | 1.18 | 194 | 0.953 | 43.2 | 0.212 | 165 | 155 |
| | 25 | 120 | 188 | 922 | 4.91 | 212 | 1.13 | 164.4 | 0.876 | 38.6 | 0.205 | 302.1 | 164.7 |
| 24 days: | | | | | | | | | | | | | |
| Controls | 0 | 132 | 225 | 897 | 4.02 | 159 | 0.908 | 55.1 | 0.245 | 15.6 | 0.065 | 11.0 | 12.7 |
| A | 13 | 139 | 227 | 1,054 | 4.62 | 250 | 1.10 | 186 | 0.821 | 44.9 | 0.198 | 679 | 433 |
| | 26 | 134 | 207 | 968 | 4.66 | 211 | 1.02 | 194.9 | 0.947 | 45.3 | 0.218 | 902.4 | 414.4 |
| B | 25 | | 199 | | 4.6 | | 1.1 | 19.4 | 0.6 | | 0.16 | 737 | |
| C | 12.5 | 128 | 216 | 1,024 | 4.73 | 235 | 1.08 | 177 | 0.82 | 42 | 0.195 | 75 | 91 |
| | 25 | 136 | 201 | 1,029 | 5.12 | 227 | 1.13 | 172.9 | 0.852 | 39.5 | 0.194 | 233.8 | 165.5 |
| 31 days: | | | | | | | | | | | | | |
| Controls | 0 | 128 | 230 | 909 | 3.94 | 207 | 0.869 | 49.4 | 0.213 | 10.5 | 0.045 | 13.0 | 17.5 |
| A | 13 | 136 | 242 | 981 | 4.08 | 226 | 0.940 | 197 | 0.818 | 44.7 | 0.185 | 377 | 407 |
| | 26 | 116 | 194 | 916 | 4.73 | 207 | 1.07 | 166.4 | 0.861 | 37.8 | 0.195 | 927 | 480.2 |
| B | 25 | | 189 | | 4.6 | | 1.05 | 151.2 | 0.80 | | 0.18 | 728 | |
| C | 12.5 | 144 | 260 | 1,008 | 3.88 | 229 | 0.88 | 156 | 0.600 | 39.6 | 0.153 | 58 | 38 |
| | 25 | 119 | 171 | 837 | 5.00 | 192 | 1.14 | 146 | 0.852 | 33.5 | 0.194 | 193.2 | 91.9 |
| 38 days: | | | | | | | | | | | | | |
| Controls | 0 | 138 | 256 | 865 | 3.37 | 204 | 0.793 | 61.8 | 0.243 | 15.0 | 0.059 | 11.8 | 11.8 |
| A | 13 | 154 | 261 | 1,060 | 4.06 | 246 | 0.940 | 170 | 0.655 | 14.6 | 0.160 | 143 | 254 |
| | 26 | 111 | 223 | 967 | 4.33 | 229 | 1.02 | 232.6 | 1.038 | 537.3 | 0.238 | 678 | 429.6 |
| B | 25 | 148 | 265 | | 4.3 | | 0.9 | 181.5 | 0.7 | | 0.17 | 373 | |
| C | 12.5 | 136 | 254 | 982 | 3.86 | 225 | 0.880 | 126 | 0.498 | 29.1 | 0.116 | 56 | 31 |
| | 25 | 106 | 211 | 852 | 4.05 | 200 | 0.95 | 162.2 | 0.796 | 41.9 | 0.206 | 343.6 | 173.5 |

Figure 2:
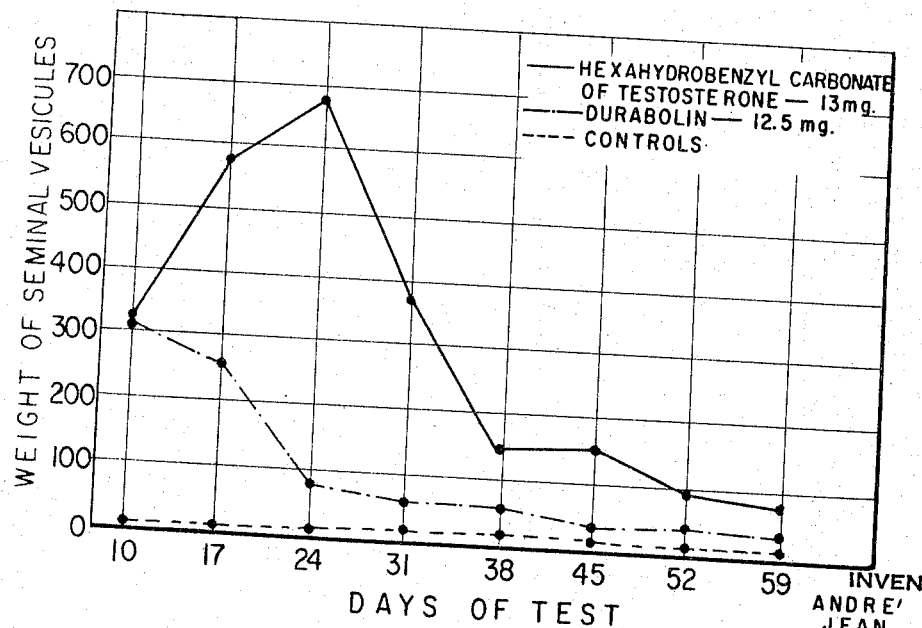
FIG. 2 is a graph comparing the prolonged anabolic activity of the same two products.

Another test was performed to compare prolonged activity of equimolar doses of hexahydrobenzyl carbonate of testosterone (13 mg.) and phenyl propionate of 19-nor-testosterone (12.5 mg.) which is sold commercially as a delayed androgenic-anabolic agent. The lots of five animals were sacrificed and autopsied as before 31, 38, 45, 52 and 59 days after the treatment began. The results obtained have been plotted as graphs in FIGS. 1 and 2. The prolonged androgenic and anabolic activity of hexahydrobenzyl carbonate of testosterone is clearly superior to phenylpropionate of testosterone and lasts for a period of at least 16 weeks.

*Determination of acute toxicity*

The tests of acute toxicity were made on mice of the Rockland strain weighing between 18 and 22 grams. Hexahydrobenzyl carbonate of testosterone was dissolved in an oily solvent and injected by subcutaneous methods into a lot of 10 mice at a dose of 150 mg./kg. The animals were held under observation for a period of a week 2. A composition having prolonged anabolic and androgenic activity which comprises 100 to 500 mg. of the hexahydrobenzyl carbonate of testosterone and a major amount of a pharmaceutical carrier.

3. The composition of claim 2 wherein the pharmaceutical carrier is an oily solvent.

4. A method of inducing prolonged androgenic and anabolic activity in warm blooded animals which comprises administering to the animals in a single dose an effective amount of the hexahydrobenzyl carbonate of testosterone.

5. The method of claim 4 wherein the effective amount for humans is 100 to 500 mg. to the adult.

References Cited by the Examiner

UNITED STATES PATENTS 3,056,727   10/1962   Allais et al. _____ 167—74

LEWIS GOTTS, *Primary Examiner.*

HENRY A. FRENCH, *Assistant Examiner.*